United States Patent
Chan

Patent Number: 5,704,728
Date of Patent: Jan. 6, 1998

[54] LINKING ASSEMBLY FOR AN INSERTED-AND-CONNECTED LAMP POLE

[76] Inventor: Kam Hoi Chan, 6/F Kenning Industrial Bldg 19 Wang Hoi Road, Kowloon Bay, Hong Kong

[21] Appl. No.: 571,893

[22] PCT Filed: Apr. 19, 1994

[86] PCT No.: PCT/CN94/00028

§ 371 Date: Feb. 1, 1996

§ 102(e) Date: Feb. 1, 1996

[87] PCT Pub. No.: WO95/28600

PCT Pub. Date: Oct. 26, 1995

[51] Int. Cl.⁶ ................... F16B 7/04; F16B 21/08
[52] U.S. Cl. ................. 403/298; 403/300; 403/292
[58] Field of Search ...................... 403/297, 298, 403/292, 300

[56] References Cited

U.S. PATENT DOCUMENTS

| | | | |
|---|---|---|---|
| 139,932 | 6/1873 | Sweetland | 403/298 X |
| 1,051,427 | 1/1913 | McCluskey | 403/292 X |
| 1,797,691 | 3/1931 | Merrill | 403/292 X |
| 2,854,744 | 10/1958 | Crockett | 403/300 X |
| 3,342,511 | 9/1967 | Galloway | 403/297 X |
| 3,759,623 | 9/1973 | Hesse | 403/298 |
| 3,964,339 | 6/1976 | Antonio et al. | 403/297 X |
| 4,068,346 | 1/1978 | Binder | 403/300 X |
| 5,016,154 | 5/1991 | Leeyeh | |
| 5,149,149 | 9/1992 | Wu | 403/292 X |

FOREIGN PATENT DOCUMENTS

| | | |
|---|---|---|
| 2111437U | 7/1992 | China . |
| 92201856.1 | 9/1992 | China . |
| 92225228.9 | 4/1993 | China . |
| 1280445 | 11/1961 | France ................. 403/298 |
| WO 94/01715 | 1/1994 | WIPO . |

*Primary Examiner*—Anthony Knight
*Attorney, Agent, or Firm*—Tilton, Fallon, Lungmus & Chestnut

[57] ABSTRACT

A linking assembly for reliably and securely interconnecting thin-walled welded tubes in order to assemble a floor lamp pole includes a hollow plug member which fits securely into one hollow tube member and mates with a socket securely fitted into an adjacent tube member. Each of the plug and the socket are provided with several slots therethrough, which provide arc flats, which are bendable inwardly to provide additional elasticity and assist insertion into a corresponding tube. An internal strengthening circumferential flange is provide to increase rigidity, and longitudinal channels in the socket and plug prevent rotation relative to the tubes of the lamp pole.

9 Claims, 4 Drawing Sheets

LINKING ASSEMBLY FOR AN INSERTED-AND-CONNECTED LAMP POLE

BACKGROUND OF THE INVENTION

1. Field of the Invention

This invention relates generally to an inserted-and-linking assembly which connects several thin-walled welded tubes, and particularly to an assembly for linking up interconnecting tubes to form an assembly a floorlamp pole.

2. Description of the Related Art

It is well known that floorlamps are available in many different sizes and styles. All of them include one or several high lamp poles. With the lowest lamp pole, it is necessary for the lamp to illuminate reading materials held in readings on a lamp user's hands who may be sitting under the light, while with the highest lamp pole, the lamp over the heads of people with normal stature serves as the rooflight. A whole lamp pole is generally divided, when produced and packed, into smaller tubes in order to facilitate its transportation and compact the lamp package. Having bought a lamp of this kind, customers join the tubes one after another into one lamp pole.

Up to now, the prior art in connecting the tubes mostly utilize thread connection. The shortcomings of the art have been mentioned several times by approved Chinese utility model patent No. CN 922-1856.1 and CN 92225228.9. Here, a brief review about the shortcomings is listed:

(1) When the tubes are screwed together, the relative rotation angle is more than 360 degrees. This not only blocks the connection operation but also exceeds the maximum twisting angle for a lamp cord or wire within the tubes because the wire's twisting angle must be less than 360 degrees.

(2) Cutting the external (or internal) threads in tube walls prevents using very thin-walled tubes, which increases the weight and cost of the pole.

(3) When threading locally strengthened welded tubes on their walls, workers have to spend more working time on convex weld seams. Moreover, because the machinability in the seam and the welding heat affected region are not same with that in other regions, the quality of the whole thread degrades.

(4) Since a tube is generally painted following its threading, the threads are usually hindered by the paint. This makes the customer's assembly of the lamp pole difficult.

Approved Chinese utility model patent No. CN92225228.9 discloses a method of tube connection. The method disclosed is first, to shrink one end of one first tube of a pair and to punch an L-shaped guide groove thereon, then to punch a convex ball at the mouth of the second tube, with the convex ball forward along the longitudinal part of the L-shaped guide groove and at the corner of the groove turn and the second tube a certain angle along its radial part, so that the two tubes will not be able to pull part by axial loads within a limit.

Although this tube-linked structure avoids the problems of threaded connection, such as restriction of using very thin-walled tubes for threading, complexity of working process, rotation among the tubes, etc., it still has its own shortcomings in its practical application. For example, 1) as a result of the transition zone sloping from an intact part down to the shrunken end, the obvious profile discontinuity of two connected tubes is not in accord with requirements of high quality products; and 2) since no measures have been taken to prevent further relative motion in the opposite direction between the pairs of tubes, only a slight relative motion may cause release. Such a contruction has a tendancy to separate each time the lamp is lifted, frequently causing foot injury by the lampbase, which is typically several kilograms in weight.

SUMMARY OF THE INVENTION

Accordingly, it is the objects of the invention to overcome the disadvantages of the prior art and to provide a linking assembly for a lamp pole which shares the advantages of easy production, firm clasp, efficient fabrication, low costs, and convenient assembly.

In assembly, with aligning the tube having the socket with one having the plug and pushing the tubes against each other, one finishes pole connection at once with a click (the click can be sensed by the worker).

The lamp pole of the present invention can be easily disassembled by just pulling the tubes oppositely. Of course, the critical disconnection load is decided according to the lamp weight and correlated safety criterion, at least a 15 kilogram force, or the force by which ordinary men could not separate them easily, is preferred.

BRIEF DESCRIPTION OF THE DRAWINGS

The following illustrates a practical embodiment according to the present invention, in which.

DETAILED DESCRIPTION OF THE PREFERRED EMBODIMENTS

Figure 1:
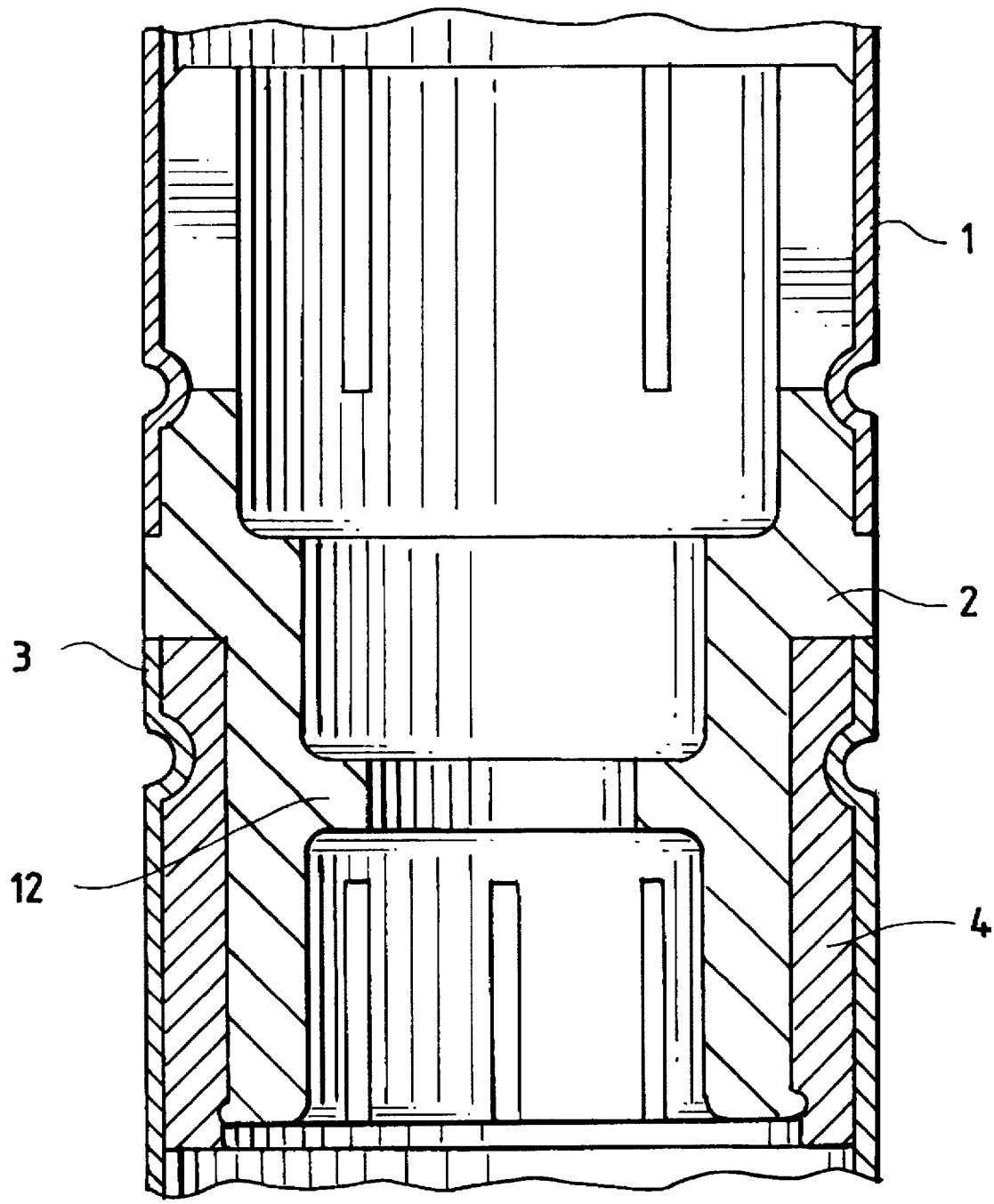
FIG. 1 is a vertical section view of the assembly, which shows the connection of the upper and lower tubes with the plug and the socket respectively.

With reference first to FIG. 1, numeral 1 generally indicates an upper tube (although it is recognized that the term "upper" is used here just for simplicity, and it does not mean that the assembly must be used in vertical way.) and numeral 2 indicates a plug used to form press-fit with upper tube 1. Similarly, numeral 3 indicates a lower tube, and numeral 4 indicates a socket forming a press-fit with lower tube 3 (here, socket 4 is not necessary to be installed in lower tube 3, and if it is used in upper tube 1, lower tube 3 will alternatively mate with the plug 1). In FIG. 1, a convex circumferential reinforcement in the shape of a hemisphere is formed at the external rim of the lower cylinder (called connecting hollow cylinder below) of plug 2 and can form a clasp with a concave fitting circumferential groove in the internal wall of socket 4's bottom. When upper tube 1 and lower tube 3 are pulled in opposite directions, upper tube 1 holding plug 2 is drawn out of socket 4.

Figure 2:
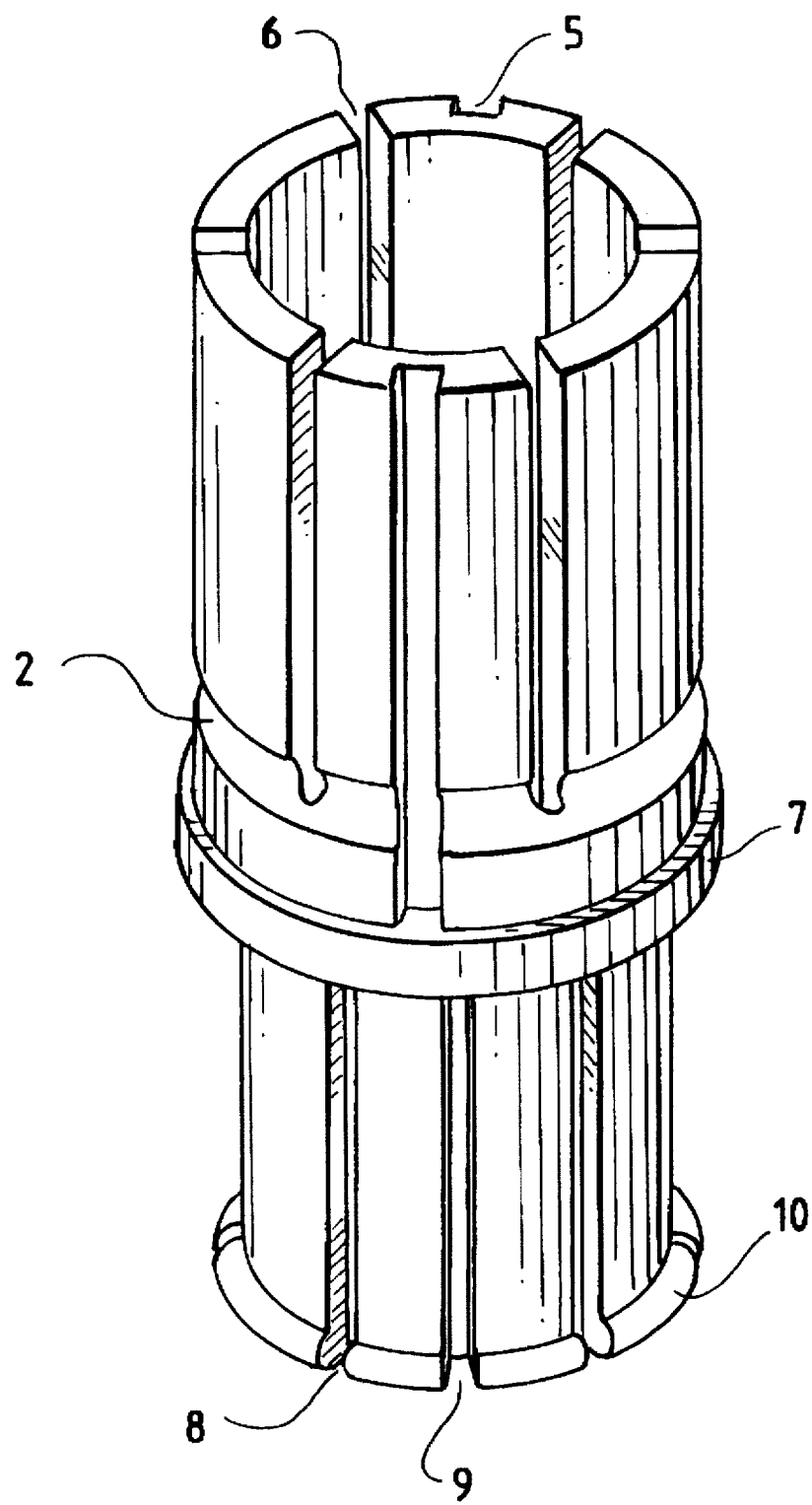
FIG. 2 is a perspective view of the plug of the assembly, which shows the outer configuration of the plug.

In FIG. 2, the outer configuration of plug 2 is clearly shown. Plug 2 here is mass produced with plastic material by injection molding (another way of producing the plug is to use a low-melting point alloy with a casting die.) Plug 2 generally includes three hollow cylinders. The lower part of the upper hollow cylinder (called basic hollow cylinder below) has a concave circumferential groove having a semicircular cross section (for simplicity, the cross section of the groove is supposed as semicircle, indeed it may be various configurations, e.g. triangle, saw tooth, and the number of the grooves may be more than one), which can fit with the concave circumferential reinforcement formed in the conventional way at the mouth of upper tube 1. The linking assembly according to the present invention is specially designed for inexpensive welded tubes. As it is known, when a welded tube is 36 millimeters in diameter, its wall is about 1 millimeter in thickness, the height of the protruding seam on its internal wall is no more than 0.5 millimeter, and its width is no more than 1 millimeter (it is understood that the outer appearance of the tube desirably shall bear no protruding welded seam, and that after painting, it is smooth and traceless). Plug 2's basic hollow cylinder fitting with the internal wall of tube 1 has a plurality of channels 5 along its outer wall to receive and hold the welding seam. FIG. 2 shows two channels 5. Increasing or reducing the channel number depends on the practical situation, nevertheless, the more the number of channels 5, the easier the alignment operation. During assembly, supposing the hollow cylinder of plug 2 has six channels 5, plug 2 is haphazardly taken and turned at most 30 degrees and then the alignment of channels with the welding seam of the tube 1 is achieved. In the embodiment given here, the channels 5 are preferably 1.5 millimeter wide and 1 millimeter deep.

After the alignment between channel 5 of plug 2 and the welded seam on the internal wall of upper tube 1, plug 2 is pressed into upper tube 1 in such a manner that, when a force is applied on the lower end of collar 7 in the middle of plug 2, the upper end of collar 7 will move and finally touch the opening of upper tube 1. A plurality of slots 6 (six slots are shown in FIG. 2) are formed in the basic hollow cylinder of plug 2. The mouth of the basic hollow cylinder can be elastically narrowed in the press-in procedure, and after getting to the destination, the mouth of the basic hollow cylinder recovers under elastic action. See FIG. 1 for detail.

In addition to receiving the protruding welding seam, channels 5 utilize the protruding welding seam positively to prevent relative rotation between upper tube 1 and plug 2. Moreover, apart from helping to align with the welded seam, increasing the number of channels 5 reduces the contact area, and hence, improves the contacting stress between plug 2 and upper tube 1, whereby the connection is strengthened. This contributes toward augmenting elasticity of six arc flats formed by six slots 6 simultaneously. This is particularly helpful to mounting with a press-fit.

Figure 5A:
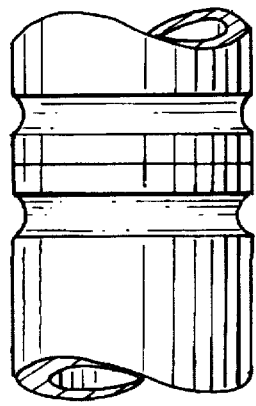
FIG. 5A is a profile sketch of a first configuration the connection sections of the invention may take.
Figure 5B:
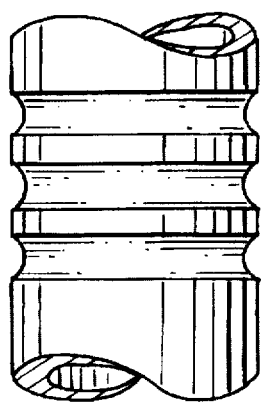
FIG. 5B is a profile sketch of a second configuration the connection sections of the invention may take.
Figure 5C:
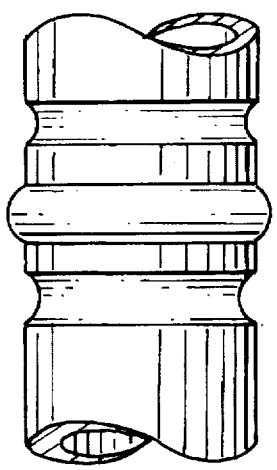
FIG. 5C is a profile sketch of a third configuration the connection sections of the present invention may take.

Besides its decorative function, collar 7 is provided so that the semicircular circumferential reinforcement in upper tube 1 can be formed to come to the end of tube 1 as nearly as possible. This will facilitate the rolling operation. It can be seen from FIG. 1 that, if collar 7 is removed, the internal bottoms of the slots of plug 2 have to be elevated correspondingly, and this will reduce elasticity of the six arc flats in the basic hollow cylinder of plug 2, and even cause breaking down during mounting. Obviously the semicircular circumferential reinforcement of tube 1 has to rise following the elevation of the internal bottom which enlarges the distance between the rolled circumferential reinforcement and the end of upper tube 1. If this happens, the different depth in rolling the concave semicircular circumferential reinforcement in upper tube 1 and lower tube 3 slows down production. However, it is understood that the collar 7 is not an indispensable portion. The existence of collar 7 multiplies the aesthetics of the connection portion between two tubes as well. Three configurations in FIGS. 5A, 5B and 5C show the forms which the linking assembly can have. As mentioned before, the shape of the cross section of the concave circumferential reinforcements at the end of the tubes is not required to take the form of a hemisphere. By the same reasons, collar 7 need not be restricted to the shape of a rectangle or semicircle. It is an injection molding production, and any complex shape can be adopted and can be galvanized. Therefore, its advantages of decoration and variety of the linking assembly are unparalleled by any prior art.

Figure 3:
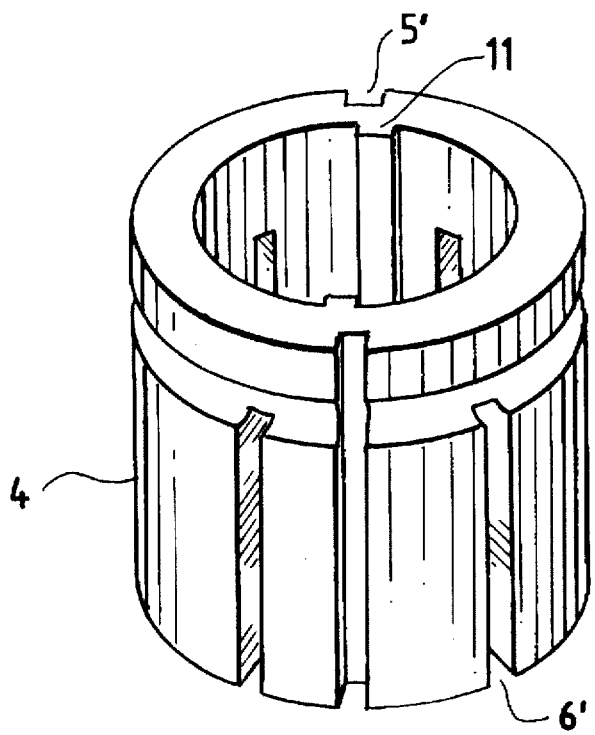
FIG. 3 is a perspective view of the socket of the assembly, which shows the configuration of the socket.

Socket 4 is shown in FIG. 3. Socket 4 has six slots 6' and two channels 5', as well as a circumferential groove which has a semicircular cross section and is used to fit with the circumferential reinforcement in lower tube 3. The difference from plug 2 is the absence of collar 7 in FIG. 2. But as mentioned before, collar 7 in plug 2 is selective, collar 7 can be added to socket 4 as it is added to plug 2. Since there is no difference between the principle of press-fit between socket 4 and lower tube 3 and that between plug 2 and upper tube 1, description thereof is omitted. Two radial projections 11 along the longitudinal direction on the internal wall of socket 4 shown in FIG. 3, which imitate the protruding weld seam on the internal wall of the welded tube, prevents the relative rotation between socket 4 and plug 2. Because socket 4 is made of plastic material, two projections are adopted to give its total strength close to that of the iron welding seam on the internal wall of the upper tube.

Detailed illustration has been given to the principle of the press-fit between two plastic components and the tubes and the structure used to prevent the relative rotation among the components after the press-fit. The detailed description of the tube connection will be given below.

Figure 4:
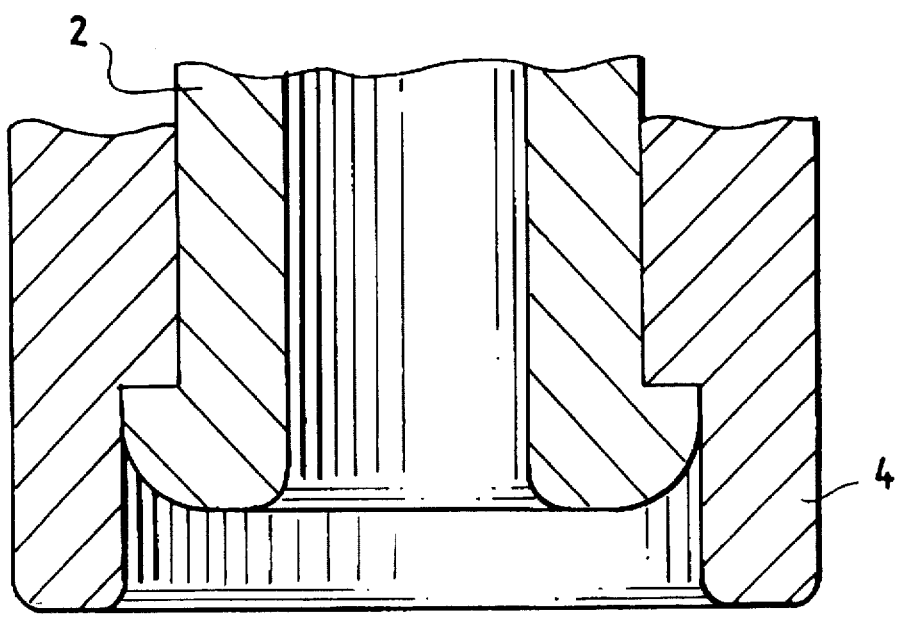
FIG. 4 is a schematic drawing of the permanent clasp formed by the plug and socket according to the invention.

Referring the FIG. 1, when plug 2 is about to be inserted into socket 4, firstly align the two channels 9 in the connecting hollow cylinder of plug 2 (only one channel can be seen in FIG. 2, which has the same function as channel 5) with two projections 11 in socket 4, and have convex semicircular circumferential reinforcement 10 at radius r and at the external rim of the connecting hollow cylinder touching the chamfered upper edge of the internal hole of socket 4, and then force the six arc flats formed by six slots 8 in the connecting hollow cylinder of plug 2 to bend inward so as to push the connecting hollow cylinder of plug 2 into the internal hole of socket 4, until the assembled position is completed. At that time, the six arc flats in the connecting hollow cylinder of plug 2 recover, and the semicircular circumferential reinforcement 10 on the connecting hollow cylinder of plug 2 is received in the fitting circumferential groove at the end of the internal hole of socket 4. If plug 2 is not intended to be pulled away from socket 4 after the first mating, the cross section of circumferential reinforcement 10 can be modified to have a shape of one quarter of a circle like that is shown in FIG. 4. It is quite reasonable to change it into a triangle, saw tooth or some other geometric forms.

No matter what the shape of the circumferential reinforcement 10 on the connecting hollow cylinder of plug 2 and that of the internal circumferential groove of socket 4 are, the axial prestress between them become null when they match very well. If there exists an error and very small axial clearance between them, which can be felt by hands, the quality of the whole product is diminished. Considering the circumferential reinforcement 10 in FIG. 2 as an example, during the inserting procedure (working stroke), change of axial force is plotted in FIG. 6A. Distance R is an abscissa axis and denotes that, at the beginning, the circumferential reinforcement 10 has to contract back with distance R, and the maximum axial resistant force A is produced at this time. After circumferential reinforcement 10 has contracted wholly, friction resistant force B as only an axial force is left in the course of pushing. When the circumferential reinforcement 10 goes to the fitting region, the friction resistant force diminishes. Until the circumferential reinforcement 10 mates with the fitting groove completely, any axial forces disappear. On the contrary, during the back stroke, to move circumferential reinforcement 10 out of the fitting groove, maximum load is indispensable. Only friction resistance force is kept after separation from the groove, and no axial force available after separating from socket 4.

Figure 6A:
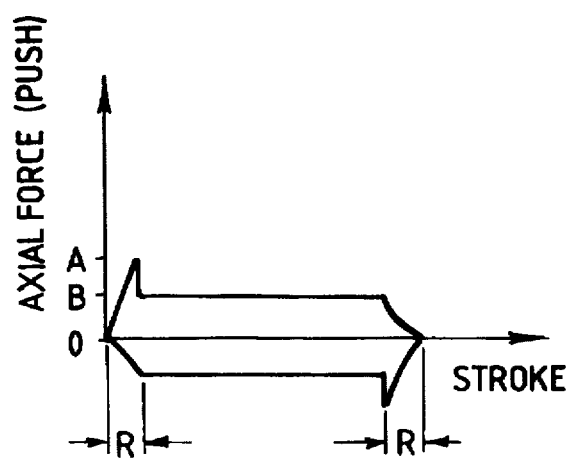
FIG. 6A is a diagram showing axial force relative to stroke of the clasp in the invention.

From FIG. 6A, one can see that the real critical distance is only R, and distance R has to be designed in a limited range. Circumferential reinforcement 10, as a component to form a connection, is not able to avoid axial clearance completely, which means that the connection between the plug and socket only by reinforcement 10 is not in conformity with the practical requirements. For solving the problem, a strengthening flange 12 is provided in the connecting hollow cylinder of plug 2. With the strengthening flange 12, in addition to improving the elasticity of the circumferential reinforcement 10, the main purpose is to keep the connecting hollow cylinder at the position where the flange is formed from narrowing, whereas it allows the portions above and below flange 12 a certain degree of narrowing. As shown in FIG. 1, the diameter of the internal hole of socket 4 at the central point of the concave semicircular circumferential reinforcement of lower tube 3 is the least. This is because under this position lies slot 6', above it exists no stationary-fit between the socket and the welded tube, and only at the portion of the circumferential reinforcement of lower tube 3 is press-fit required and stationary-fit left, that this least diameter is obtained (to get it, this is not the only way and the least diameter can be formed on the internal wall of socket 4).

Figure 6B:
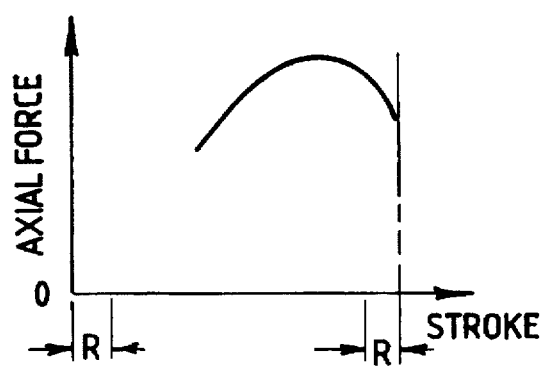
FIG. 6B is a diagram showing axial force relative to stroke of the strengthened flange in the invention.

Thus, as shown in FIG. 1, the strengthening flange 12 lies under the concave semicircular circumferential reinforcement of lower tube 3. In other words, in this matching system, the portion of the plug at the maximum diameter where flange 12 is located must be contracted in order to go through the minimum section of the internal hole of the socket. Since they are made of plastic, they have great elasticity. Their working force curve is plotted in FIG. 6B. It can be concluded that the axial force (push or pull) could be great, that its working distance could be much longer than distance R (for the radius of the cross section of the concave semicircular circumferential reinforcement in lower tube 3 is greater than that of circumferential reinforcement 10), and that a certain amount of axial stress remains after plug 2 finishes the full stroke. Thus, if plug 2 is to be pulled out of socket 4, not only does the friction force need to be overcome, but also the deforming resistance force must be created. As a consequence, there is no axial clearance to be felt by hands after the connection has been completed.

POSSIBILITY OF ITS INDUSTRY APPLICATIONS

The detailed description about the structure and function of this invention is depicted above, and the effects of the linking assembly are listed below:

(1) By using the least expensive thin-walled welded tube and a couple of injection molding parts as components to produce the sectional lamp pole, material cost tends to be minimized, as does the working time.

(2) By utilizing the stopping function of the welding seam on the tube wall and the deformation during press-fit to stop disconnection and enhance stress, every aspect of the component functions is fully used.

(3) The aesthetics of the product is enhanced. Two tubes can be linked directly, and a decorating circumference with different kinds of patterns and colors including galvanization can also be added between two tubes. Undoubtedly, is suitable the present invention for linking any painted lamp pole.

(4) The fixation of the linking assembly for the inserted-and-connected tubes is very convenient, and a press-fit with a linear movement is all that is required. In factories, it will be done by a manual lever-type press machine in two operations. Customers only need to align the upper tube and lower tube and push them with force, and their release is automatically prevented.

I claim:
1. A linking assembly for an inserted and connected lamp pole, comprising:
   an upper thin-walled welded tube having a lower end and a circumferential wall with a welding seam extending radially inward, and a rolled concave circumferential reinforcement being defined by a deformation of said wall and close to said lower end;
   a lower thin-walled welded tube having an upper end and a circumferential wall with a welding seam extending radially inward, and a rolled concave circumferential reinforcement being defined by the deformation of said wall of the lower tube and close to said upper end of the lower tube;
   a socket adapted to insert in said lower tube with a stationary fit in such a manner that a minimum inner diameter of said socket is reached at the place where said rolled concave circumferential reinforcement of the lower tube is located, and having a first basic hollow cylinder with an internal hole, a fitting circumferential groove extending axially around the outside of said basic hollow cylinder, a plurality of longitudinal slots through the first basic hollow cylinder and extending to an end of said lower thin-walled welded tube so as to form a plurality of arc flats in the socket which can bend radially inward when said socket is inserted in said lower tube, one or more longitudinal channels on the first basic cylinder and extending radially inward to receive said welding seam of said lower tube to both prevent the rotation of said socket relative to said lower tube and increase the contact stress therebetween, and two longitudinal projections in the internal hole of said socket;
   a hollow plug having a second basic hollow cylinder adapted to insert in said upper tube with a stationary fit in such a manner that a minimum inner diameter of the cylinder is reached at the place where said rolled concave circumferential reinforcement of the upper tube is located, a concave circumferential groove extending axially around the outside of said second basic hollow cylinder close to a first end of said second basic hollow cylinder, a plurality of longitudinal slots through the second basic hollow cylinder and extending to a second end opposite to the concave circumferential groove so as to form a plurality of arc flats which can bend radially inward when the second basic hollow cylinder is inserted into said upper tube, and one or more longitudinal channels on the second basic hollow cylinder and extending radially inward to receive said welding seam of said upper tube to both prevent the rotation of said plug relative to said upper tube and increase the contact stress therebetween; and a connecting hollow cylinder adapted to be inserted in the internal hole of said socket with a stationery fit and having one end integrally connected with said first end of said second basic hollow cylinder where the concave circumferential groove of the second basic hollow cylinder is located and another end with a convex, outwardly directed circumferential reinforcement, a plurality of longitudinal slots through said connecting hollow cylinder and extending to said end where the convex circumferential reinforcement is located so as to form a plurality of arc flats which can bend radially inward when said connecting hollow cylinder is inserted in the internal hole of said socket, and an internal strengthening circumferential flange in the connecting cylinder, extending radially inward and having a position below the rolled concave circumferential reinforcement of said lower tube when said socket is inserted in said lower tube and when the connecting hollow cylinder is inserted in said socket, and two longitudinal channels on the outside of said connecting cylinder to receive said two longitudinal projections in the internal hole of said socket to prevent the relative rotation between said socket and said plug.

2. A linking assembly as claimed in claim 1 wherein a collar is provided between the basic cylinder and the connection cylinder of said plug.

3. A linking assembly as claimed in claim 1 wherein said plug and said socket are made of plastic material.

4. A linking assembly as claim in claim 1 wherein said plug and socket are made of an alloy with casting die.

5. A linking assembly as claim in claim 1 wherein the connection formed by the convex circumferential reinforcement of said plug and the fitting circumferential groove of said socket is detachable.

6. A linking assembly as claimed in claim 1 wherein the connection formed by the convex circumferential reinforcement of said plug and the fitting circumferential groove of said socket is not detachable.

7. A linking assembly as claimed in claim 1 wherein the cross section of the rolled concave circumferential reinforcement of each of said tubes has a shape of one of a semicircle, a triangle, or saw teeth.

8. A linking assembly as claimed in claim 1 wherein the number of the rolled concave circumferential reinforcement of said tubes is more than one.

9. A linking assembly as claimed in claim 1 wherein the wall of said tubes is 1 mm thick and the channels are 1.5 mm wide and 1 mm deep.

* * * * *

UNITED STATES PATENT AND TRADEMARK OFFICE
CERTIFICATE OF CORRECTION

PATENT NO. : 5,704,728
DATED : January 6, 1998
INVENTOR(S) : Kam Hoi Chan

It is certified that error appears in the above-indentified patent and that said Letters Patent is hereby corrected as shown below:

Claim 4, Column 8, Line 8, "claim" should be ---claimed---

Claim 5, Column 8, Line 10, "claim" should be ---claimed---

Signed and Sealed this

Seventeenth Day of March, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,704,728
DATED : January 6, 1998
INVENTOR(S) : Kam Hoi Chan

It is certified that error appears in the above-identified patent and that said Letters Patent is hereby corrected as shown below:

ON THE TITLE PAGE:

Please add item --[73] Assignee: Go-Gro Industries Limited, Kowloon Bay, Hong Kong--.

Signed and Sealed this

Twelfth Day of May, 1998

*Attest:*

BRUCE LEHMAN

*Attesting Officer*  Commissioner of Patents and Trademarks